United States Patent
Kemp et al.

(10) Patent No.: US 10,442,934 B2
(45) Date of Patent: Oct. 15, 2019

(54) METHODS OF USING N-CONTAINING COMPOUNDS WITH CARBON BLACK TO REPLACE PAN AND FORM CARBON FIBERS

(71) Applicant: STC.UNM, Albuquerque, NM (US)

(72) Inventors: Richard Alan Kemp, Albuquerque, NM (US); Mahmoud Reda Taha, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 27 days.

(21) Appl. No.: 15/537,241

(22) PCT Filed: Dec. 18, 2015

(86) PCT No.: PCT/US2015/066769
§ 371 (c)(1),
(2) Date: Jun. 16, 2017

(87) PCT Pub. No.: WO2016/100863
PCT Pub. Date: Jun. 23, 2016

(65) Prior Publication Data
US 2017/0362441 A1    Dec. 21, 2017

Related U.S. Application Data

(60) Provisional application No. 62/094,330, filed on Dec. 19, 2014.

(51) Int. Cl.
*C09C 1/00* (2006.01)
*C09C 1/48* (2006.01)
(Continued)

(52) U.S. Cl.
CPC ............ *C09C 1/482* (2013.01); *C08F 120/44* (2013.01); *C09C 1/48* (2013.01); *D01F 1/10* (2013.01);
(Continued)

(58) Field of Classification Search
CPC ....... C09C 1/482; D01F 9/1275; D01F 9/225; D01F 1/10; C08F 120/44; C01B 32/158; C01B 32/159; C01B 32/16
See application file for complete search history.

(56) References Cited

U.S. PATENT DOCUMENTS

| | | |
|---|---|---|
| 4,275,051 A | 6/1981 | Barr |
| 4,572,813 A | 2/1986 | Arakawa |
| 2002/0031663 A1* | 3/2002 | Yu .......................... D01D 5/04 264/78 |

FOREIGN PATENT DOCUMENTS

| | | | |
|---|---|---|---|
| CN | 102214516 A | * | 10/2011 |
| JP | 2003089971 A | * | 3/2003 |

OTHER PUBLICATIONS

Korean Intellectual Property Office; International Search Report & Written Opinion for PCT/US2015/066769; dated Apr. 4, 2016; 12 pages; Daejeon, KR.

(Continued)

*Primary Examiner* — Richard M Rump
(74) *Attorney, Agent, or Firm* — Keith Vogt, Ltd.; Keith A. Vogt

(57) ABSTRACT

A method and precursor for making carbon fibers and the like comprising carbon black modified with at least one cyclic compound promoter. A source of the carbon black may be recycled materials such as recycled tires or recycled plastics. The carbon black is modified by attaching at least one cyclic compound promoter to the outer periphery of the carbon black.

7 Claims, 8 Drawing Sheets generic di-cyano compound pyridine 2-aminopyridine    2-cyanopyridine 1,2-dicyanobenzene 2,2'-bipyridine NH₃    N₂H₂
ammonia hydrazine R—N=C=N—R
carbodiimides
R = alkyl, aryl, silyl H₂N—C≡N
cyanamide

(51) Int. Cl.
C08F 120/44 (2006.01)
D01F 1/10 (2006.01)
D01F 9/21 (2006.01)
D01F 9/22 (2006.01)
D01F 9/127 (2006.01)

(52) U.S. Cl.
CPC .............. *D01F 9/1275* (2013.01); *D01F 9/21* (2013.01); *D01F 9/225* (2013.01)

(56) References Cited

OTHER PUBLICATIONS

Baker et al; Recent Advances in Low-Cost Carbon Fiber Manufacture from Lignin; Journal of Applied Polymer Science, 2013, vol. 130, No. 2, pp. 713-728.

Maldonado et al; Direct preparation of carbon nanofiber electrodes via pyrolysis of iron (II) phthalocyanine: electrocatalytic aspects for oxygen reduction; Journal of Physical Chemistry B, 2004; vol. 108, No. 31, pp. 11375-11383.

Huang, Xiaosong; Fabrication and properties of carbon fibers; Materials, 2009, vol. 2, No. 4; pp. 2369-2403.

Zhang et al.; Nano-carbon black filled lyocell fiber as a precursor for carbon fiber; Journal of Applied Polymer Science, 2006, vol. 99, issue 1, pp. 65-74.

Lalande et al; Catalytic activity and stability of heat-treated iron phthalocyanines for the electroreduction of oxygen in polymer electrolyte fuel cells; Journal of Power Sources, 1996, vol. 61, Nos. 1-2, pp. 227-237.

* cited by examiner

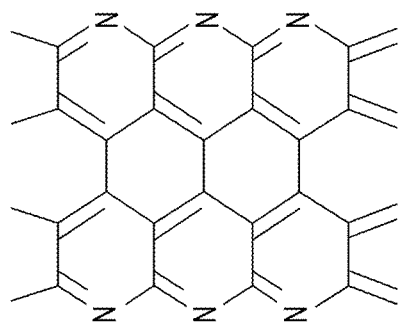
FIG. 2A
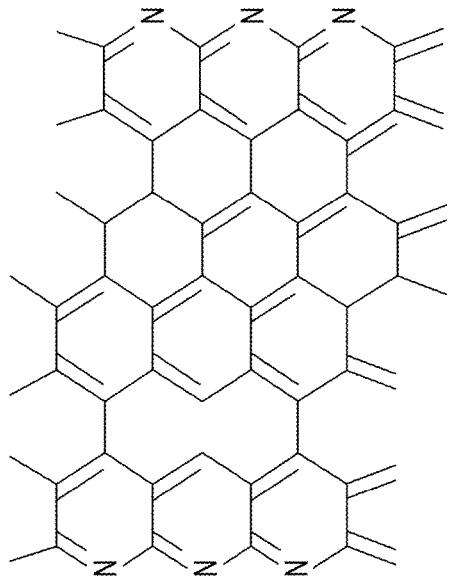
FIG. 2B
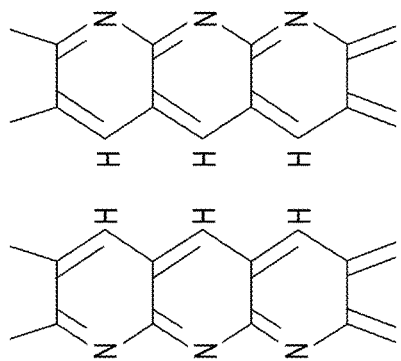
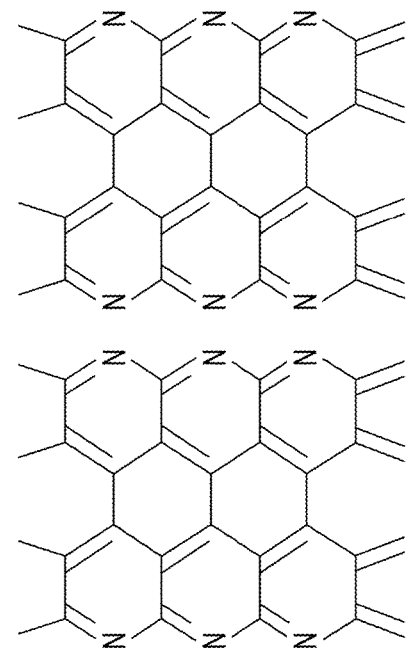

| 1 | | | | |
|---|---|---|---|---|
| Pan 9.3 | methyl acrylate 0.6 | itaconic acid 0.1 | | |

| 2 | | | | |
|---|---|---|---|---|
| Pan 8.3 | methyl acrylate 0.6 | itaconic acid 0.1 | CB 1 | |

| 3 | | | | |
|---|---|---|---|---|
| Pan 7.3 | methyl acrylate 0.6 | itaconic acid 0.1 | CB 1 | bipyridiyl 1 |

| 4 | | | | |
|---|---|---|---|---|
| Pan 7.3 | methyl acrylate 0.6 | itaconic acid 0.1 | CB 1 | fumaronitrile 1 |

| 5 | | | | |
|---|---|---|---|---|
| Pan 7.3 | methyl acrylate 0.6 | itaconic acid 0.1 | CB 1 | nn-diisopropylcarbidimide 1 |

| 6 | | | | |
|---|---|---|---|---|
| Pan 7.3 | methyl acrylate 0.6 | itaconic acid 0.1 | CB 1 | azodisobutylnitrile 1 |

CB is carbon black and quantities are in gm

Groups 1 and 5 lie within the same cluster

METHODS OF USING N-CONTAINING COMPOUNDS WITH CARBON BLACK TO REPLACE PAN AND FORM CARBON FIBERS

RELATED APPLICATIONS

This application claims the benefit of U.S. Provisional Application No. 62/094,330 filed on Dec. 19, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

In order to produce carbon fibers, an expensive nitrogen-containing polymer (polyacrylonitrile, or PAN) is generally used which is heated to ultimately give the pure carbon fibers.

BRIEF SUMMARY OF THE INVENTION

In one embodiment, the present invention provides an inexpensive and efficient method to produce pure carbon fibers. The resulting carbon fibers may be used in products such as graphene sheets and high tech composites.

In another embodiment, inexpensive carbon blacks are combined with one or more compounds that promote the formation of a cyclic carbon black compound that may be used to replace or be used in combination with the expensive PAN and/or pitch.

In another embodiment, inexpensive carbon blacks are combined with one or more nitrogen-containing organic compounds to replace or be used with part of the expensive PAN and/or pitch.

In other embodiments, the present invention simulates producing PAN-based carbon fibers by substituting recycled carbon blacks that have been modified with inexpensive nitrogen (N)-containing compounds for all or part of the expensive PAN polymer material.

In other embodiments, the present invention replaces pitch and/or PAN precursors with a precursor made from recycled carbon black that has been modified with at least one N-containing compound.

In other embodiments, the present invention chemically attaches N-containing compounds to the periphery of the carbon black to create a precursor that is similar to the chemistry associated with a PAN precursor.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 2A illustrates the structural changes of PAN-based carbon fiber during the carbonization step of the manufacturing process.

FIG. 2B illustrates the structural changes of PAN-based carbon fiber during the graphitization step of the manufacturing process.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed structure. Further, the terms and phrases used herein are not intended to be limiting, but rather to provide an understandable description of the invention.

The production of carbon fibers begins with a precursor that is typically made from polyacrylonitrile (PAN) which is a synthetic, semicrystalline organic polymer resin, with the linear formula $(C_3H_3N)$. Another less common precursor are pitches, which are generally complex blends of polyaromatic molecules and heterocyclic compounds. Pitches are often obtained from petroleum refining, coal, asphalt, or the pyrolysis of PVC. However, the vast majority of carbon fibers are made from PAN precursors.

As is known in the art, PAN precursor formation begins with an acrylonitrile monomer, which is combined in a reactor with plasticized acrylic comonomers and a catalyst to promote polymerization to create long-chain polymers that can be formed into acrylic fibers. FIGS. 1A-1B and FIGS. 2A-2B illustrate the structural changes PAN undergoes through the manufacturing processes described above and below.

Figure 1A:
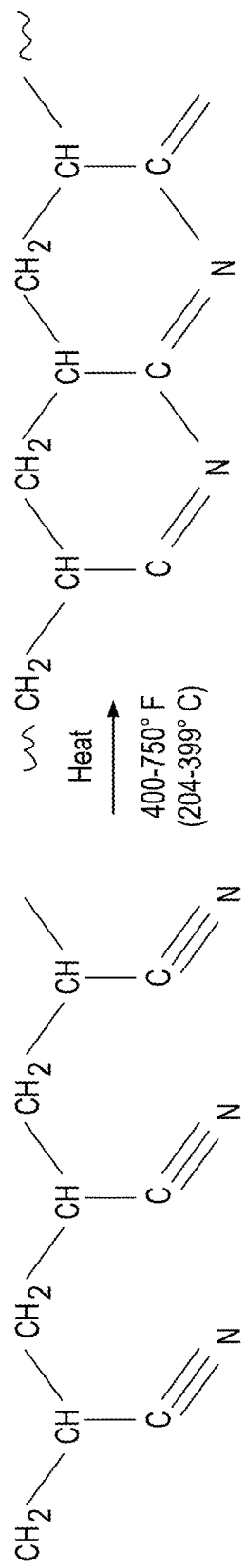
FIG. 1A is a full atomic schematic of the structural changes of PAN-based carbon fiber during the stabilization step of the manufacturing process.
Figure 1B:
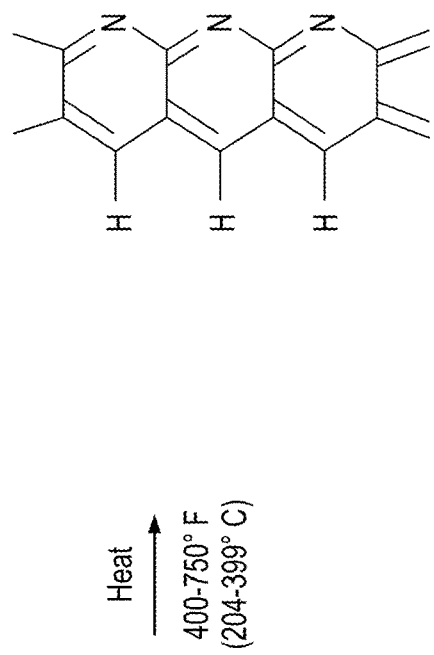
FIG. 1B is a simpler schematic (equivalent to the full atomic schematic) of the structural changes of PAN-based carbon fiber during the stabilization step of the manufacturing process.

As shown in FIGS. 1A and 1B, PAN (left side) is first heated to convert the compound from a chain-like structure to form cyclic or ringed structures (right side). To promote the formation of carbocylces and heterocycles, the compound is subject to one or more processing steps such as dehydrogenation (FIG. 2A) and denitrogenation (FIG. 2B). These steps are performed to remove hydrogen and nitrogen to promote the formation of carbocyles and heterocycles.

The PAN precursors generally undergo a process called spinning where the precursor is extruded through holes to create filaments which may repeatedly be drawn and stretched to continue orienting the PAN polymer. Next, the fiber is oxidized to cause the polymer chains to begin crosslinking to increase fiber density. In the end, the oxidized (stabilized) PAN fiber contains about 50 to 65 percent carbon molecules, with the balance a mixture of hydrogen, nitrogen and oxygen. The fibers are then carbonized to remove non-carbon molecules. The crystallization of the carbon molecules may be optimized to produce a finished fiber that is more than 90 percent carbon.

In a preferred embodiment, the present invention provides a process for making a PAN-like material for making carbon fibers by providing a carbon black precursor, a source of which may be used tires or other recycled products, modified with one or cyclic compound promoters. In other embodiments, fresh carbon black may be used as well.

Figure 2C:
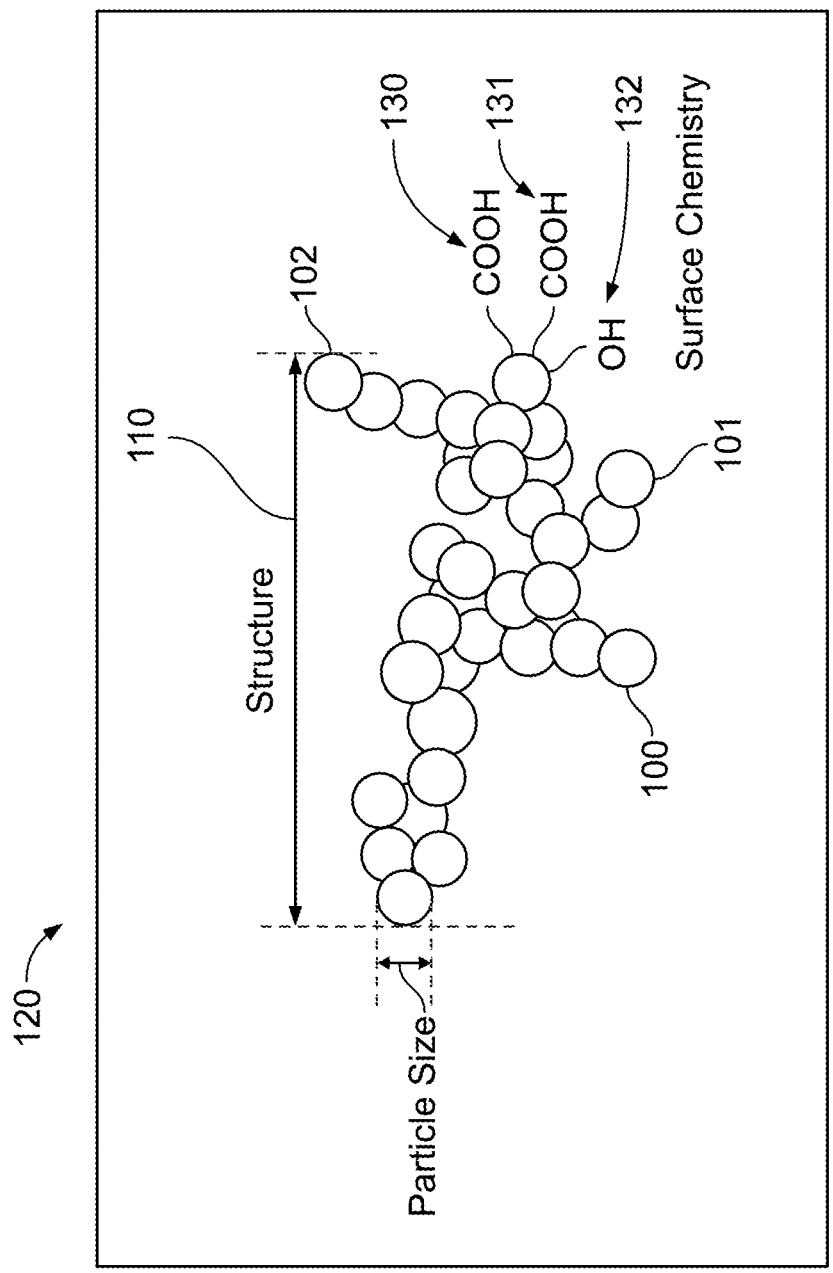
FIG. 2C illustrates a putative carbon black structure with attached cyclic compound promoters that may be used in accordance with an embodiment of the present invention.

In other preferred embodiments, the present invention provides a substitute for the PAN polymer precursor by attaching one or more cyclic compound promoters (CCPs) 100-102 (not drawn to scale or in number used) to carbon black as shown in FIG. 2C, to make a carbon black precursor 120. FIG. 2C shows an exemplary carbon black structure 110 and other carbon black structures are within the scope of the present invention.

CCPs 100-102 may be a single compound or a mixture of compounds. CCPs 100-102 may also be a monomer, a polymer or a mixture of monomers and polymers. In a preferred embodiment, CCPs 100-102 are chemically attached to carbon black structure 110. In other embodiments, CCPs 100-102 are chemically attached to the periphery and/or outer periphery of carbon black structure 110. In still further embodiments, CCPs 100-102 may also be attached to one or more functional groups 130-132.

In a preferred embodiment, the present invention uses one or more N-containing compounds, monomers, and/or polymers as the CCPs. In yet other embodiments, one or more of the compounds shown in FIG. 3 may be used as the CCPs.

Representative examples of CCPs include, but are not limited to, organics containing di-cyano groups, cyanamide, carbodiimides, pyridine, 2,2-bipyridine, ammonia, hydrazine, 2-aminopyridine, 2-cyanopyridine, and related compounds. Other compounds that may be used may or may not contain cyano-groups, but would have functionalities that simulate the cyano group cyclization process.

Figure 3:
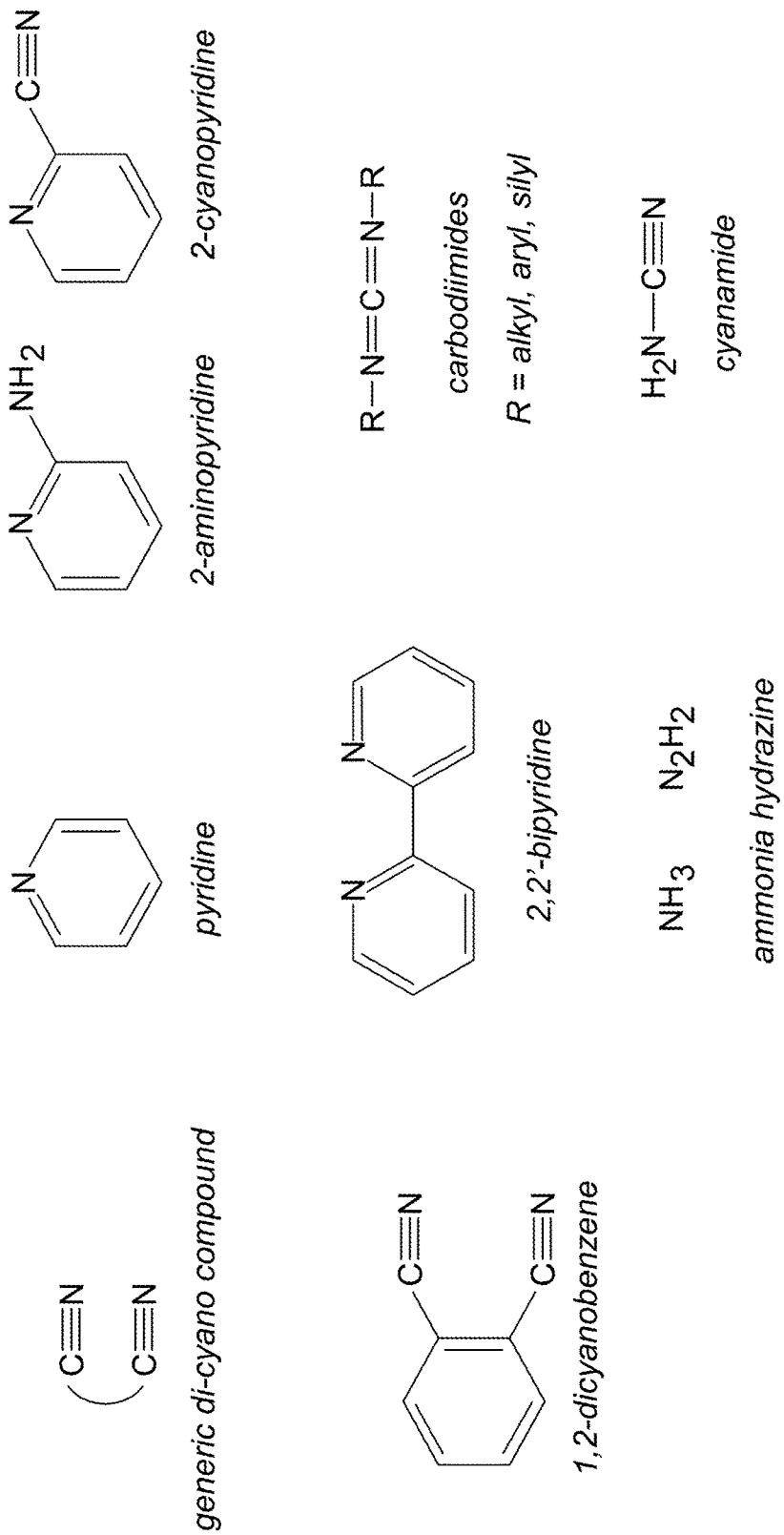
FIG. 3 illustrates generic and exemplary N-containing compounds that may be used with an embodiment of the present invention.

It is possible to generate CCPs in situ by utilizing synthetic routes that generate nitriles from other precursors, such as organic amides, organic halides, or related compounds. Other CCPs may rely on atoms that resemble the N atom in the various structure in function, yet are not N. It is well-known in the chemical literature that elements such as P which reside in the same family as N, often have similar chemistry and are capable of forming cyclic structures. Compounds as shown in FIG. 3 in which N is substituted by P would be exemplary.

Carbon black structure 110 with the attached CCPs form carbon black precursor 120 which may be processed to remove the CCPs to promote the formation of carbocyles and/or heterocycles. The processing may include one or more of the following steps 1) stabilization such as shown in FIG. 1A, 2) carbonization such as shown in FIG. 2A, and 3) graphitization such as shown in FIG. 2B. One or more of steps 1-3 may be repeated, omitted and/or performed out of order.

In one embodiment, carbon black precursor 120 may replace PAN or pitch in the production of carbon fibers. In yet other embodiments, carbon black precursor 120 may be used in combination with PAN or pitch in the production of carbon fibers, sheets and other materials.

Figure 4:
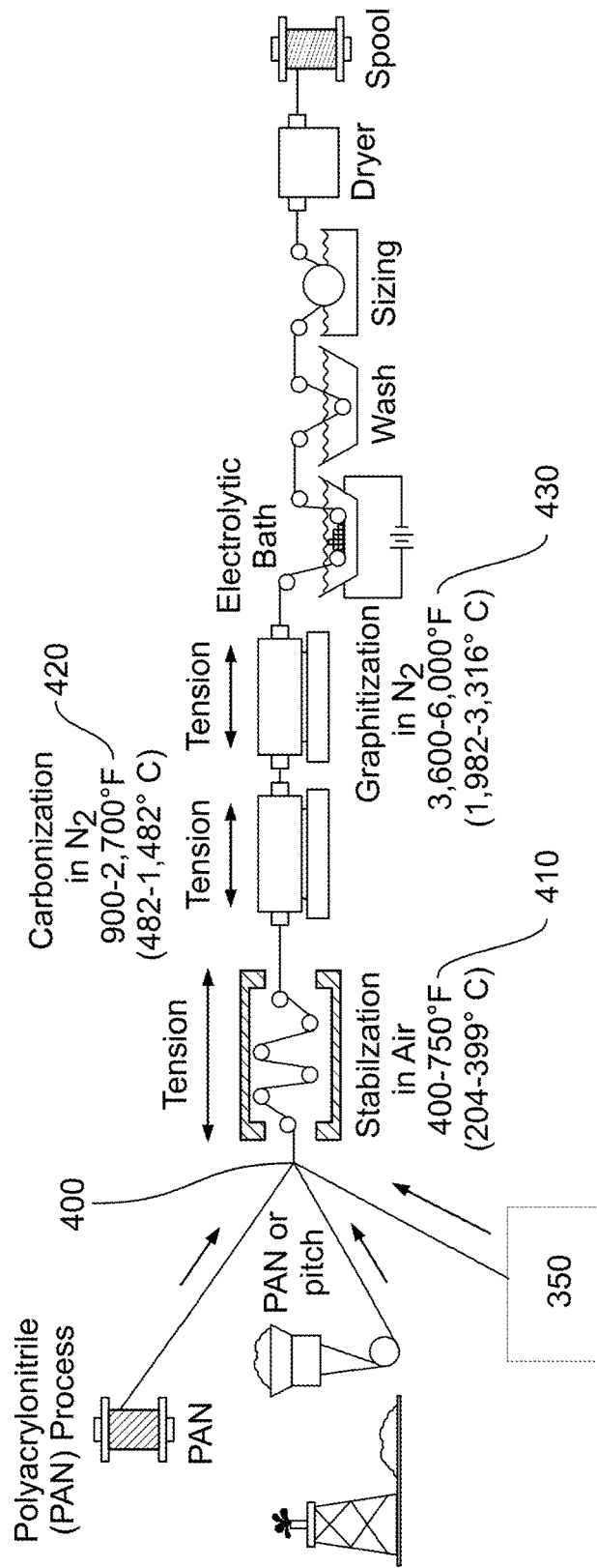
FIG. 4 illustrates a method of producing carbon fiber in accordance with an embodiment of the present invention.

FIG. 4 illustrates a method of processing carbon fibers in accordance with several embodiments of the invention. As shown, carbon black precursor 350 may replace Pan or pitch or be used in combination with PAN and/or a pitch in step 400 to create a precursor for processing. The precursor is stabilized in step 410 and then undergoes carbonization in step 420. The final step, 430, is graphitization and thereafter the carbon fibers are sized and packaged. As described above, the steps may be repeated and/or performed out of order and in differing combinations.

Figures 5, 6:
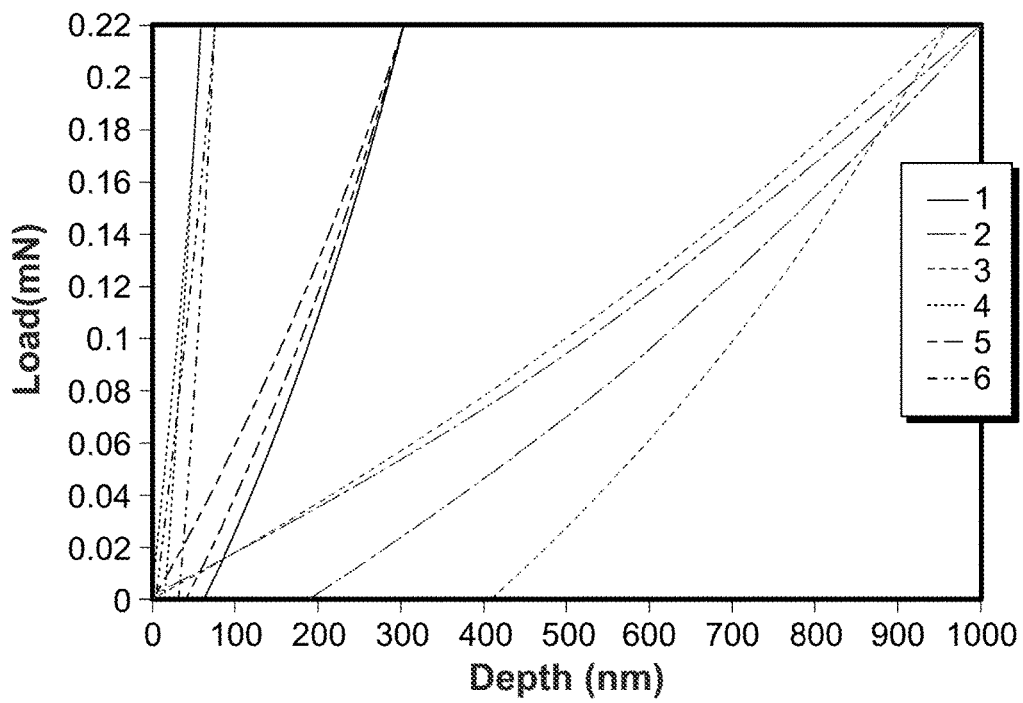
FIG. 5 illustrates mix proportions for producing carbon black based PAN-like material in accordance with an embodiment of the present invention.
FIG. 6 illustrates load-indentation depths of carbon black based PAN-like material produced in accordance with an embodiment of the present invention.
Figure 7:
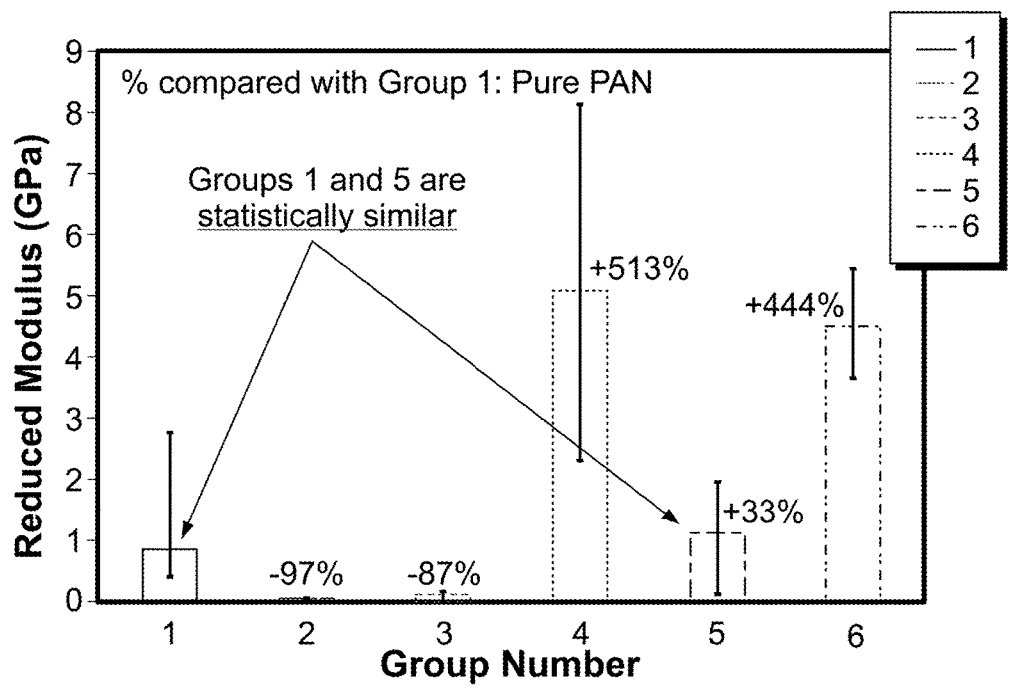
FIG. 7 illustrates the stiffness achieved by carbon black based PAN-like material produced in accordance with an embodiment of the present invention.
Figure 8:
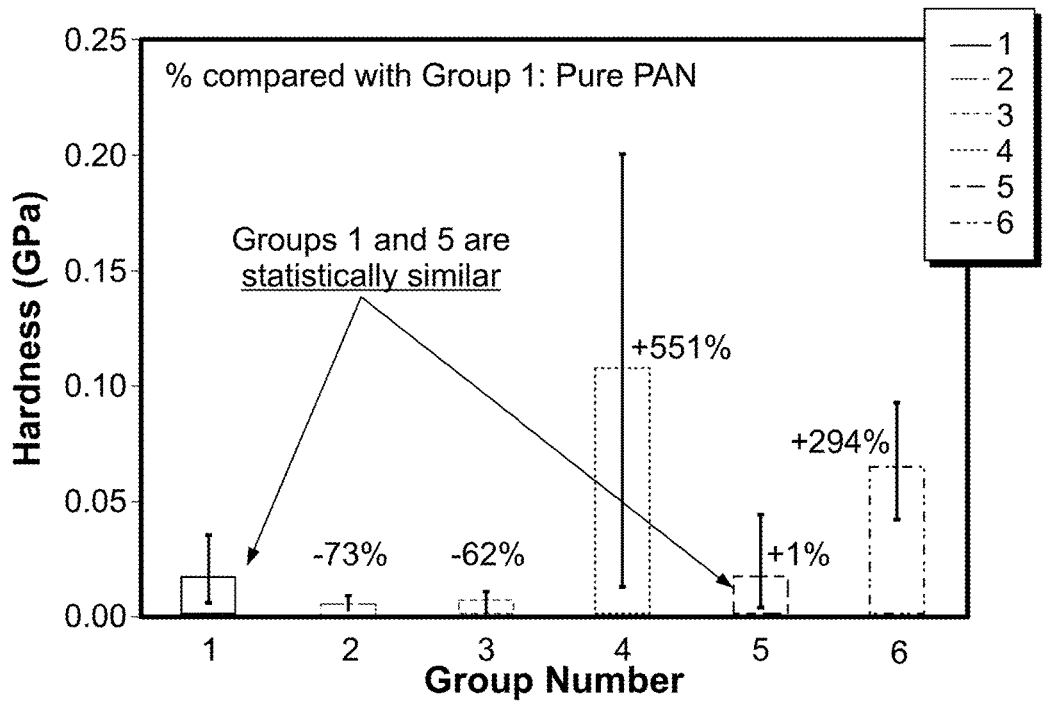
FIG. 8 illustrates the hardness (strength) achieved by carbon black based PAN-like material produced in accordance with an embodiment of the present invention.
Figure 9A:
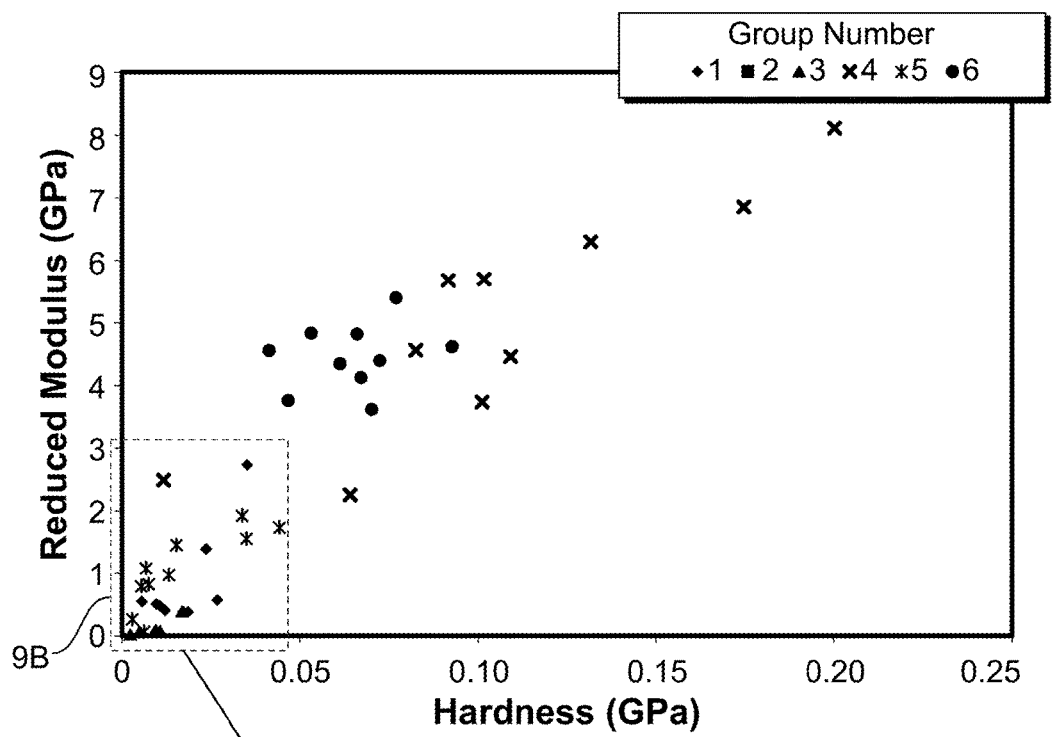
FIGS. 9A and 9B illustrate the scatter of carbon black based PAN-like material in hardness versus modulus plot showing the new material to have very similar mechanical properties to PAN
Figure 9B:
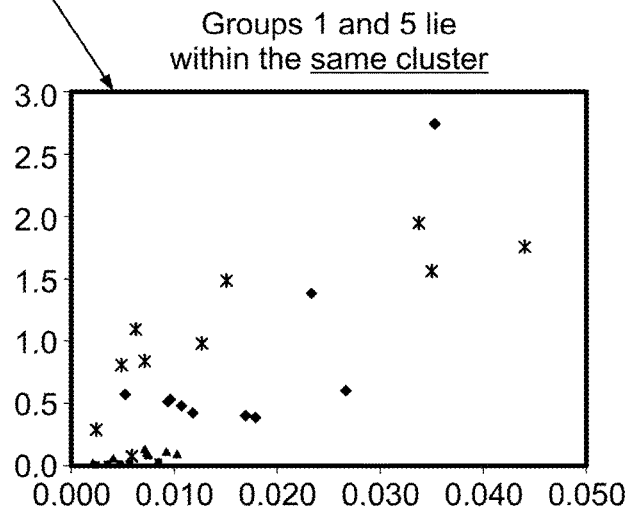

FIG. 5 illustrates mixtures of PAN, pitch and carbon black precursor 120 used in accordance with several embodiments of the invention. As shown in FIGS. 6-9, carbon fibers produced from mixture 4 have similar performance to fibers made from PAN that is mixture 1.

The lower cost of using carbon black (available from many industrial processing and recycling sources) with inexpensive CCPs, such as N-containing compounds, provides economic advantages not found in the prior art. In other embodiments, the present invention achieves approximately most of the strength of PAN-based carbon fibers using carbon black. Other forms of carbon black that may be used with the present invention include, but are not limited to, carbon black subtypes such as acetylene black, channel black, furnace black, lamp black and thermal black. Other sources of the carbon black that may also be used with the present invention include soot and the material produced by the incomplete combustion of petroleum products such as FCC tar, coal tar, ethylene cracking tar as well as fossil fuels, biofuels, biomass and vegetable oil.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. A method of making carbon fibers by providing a precursor used to make the carbon fiber, said precursor comprising carbon black modified with at least one cyclic compound promoter and PAN, said at least one cyclic compound promoter is a nitrogen (N)-containing compound wherein said precursor contains around 7 parts PAN and around 1 part carbon black.

2. The method of claim 1 wherein said N-containing compound contains cyano-groups that simulate the cyano group cyclization process.

3. The method of claim 1 wherein the precursor further comprises methyl acrylate, itaconic acid and fumaronitrile.

4. The method of claim 3 wherein the ratio of methyl acrylate to itaconic acid and fumaronitrile is ~0.6:~0.1~1.

5. A method of making carbon fibers by providing a precursor used to make the carbon fiber, said precursor comprising carbon black modified with at least one nitrogen (N)-containing compound, PAN, methyl acrylate, itaconic acid and fumaronitrile.

6. The method of claim 5 wherein said N-containing compound is from the group including organics containing di-cyano groups, cyanamide, carbodiimides, pyridine, 2,2-bipyridine, ammonia, hydrazine, 2-aminopyridine, 2-cyano-pyridine, and related compounds.

7. The method of claim 6 wherein said N-containing compound contains cyano-groups that simulate the cyano group cyclization process.

\* \* \* \* \*